(12) United States Patent
Pott et al.

(10) Patent No.: US 8,515,043 B2
(45) Date of Patent: Aug. 20, 2013

(54) CONFERENCING UNIT AND METHOD FOR CARRYING OUT MULTI-POINT COMMUNICATION

(75) Inventors: Philipp Pott, Bonn (DE); Stefan Augustin, Müchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 112 days.

(21) Appl. No.: 13/060,528

(22) PCT Filed: Sep. 3, 2009

(86) PCT No.: PCT/EP2009/006399
§ 371 (c)(1),
(2), (4) Date: Apr. 8, 2011

(87) PCT Pub. No.: WO2010/025923
PCT Pub. Date: Mar. 11, 2010

(65) Prior Publication Data
US 2011/0228923 A1      Sep. 22, 2011

(30) Foreign Application Priority Data
Sep. 4, 2008   (DE) .................. 10 2008 045 929

(51) Int. Cl.
*H04M 3/42*   (2006.01)
*H04M 11/00*  (2006.01)
*H04M 1/00*   (2006.01)
*H04L 12/16*  (2006.01)
*H04Q 11/00*  (2006.01)

(52) U.S. Cl.
USPC .................. 379/202.01; 379/93.21; 379/158; 370/260; 455/416

(58) Field of Classification Search
USPC ............ 379/93.21, 157, 158, 201.01, 202.01, 379/207.01, 203.01, 204.01; 370/259, 260, 370/261; 455/414.1, 416
See application file for complete search history.

(56) References Cited

U.S. PATENT DOCUMENTS 7,130,403 B2   10/2006  Caspi et al.
2004/0114541 A1 *  6/2004  Caspi et al. ................... 370/260

(Continued)

FOREIGN PATENT DOCUMENTS

EP    1414227 A1    4/2004
EP    1643708 A1    4/2006

(Continued)

OTHER PUBLICATIONS

Written Opinion of the International Searching Authority for PCT/EP2009/006399 dated Feb. 19, 2010 (Form PCT/ISA/237) (German Translation).

(Continued)

*Primary Examiner* — Khai N Nguyen
(74) *Attorney, Agent, or Firm* — Buchanan Ingersoll & Rooney PC

(57) ABSTRACT

The invention relates to a conferencing unit for multi-point communication in the course of a telephone conference. Previously, it was not possible to call up and document agreements and decisions in voice-based telephone conferences in a computer-aided manner. The reason was that in traditional conferencing units, all audio channels were mixed into an overall channel and therefore an undisturbed interaction of individual participants with the system is not possible. The invention enables an individual association of a conference participant with a decision processing unit, in which decisions can be announced in a dialog system and stored in a computer-readable format.

14 Claims, 1 Drawing Sheet

(56) References Cited

U.S. PATENT DOCUMENTS

| | | | |
|---|---|---|---|
| 2007/0133437 A1* | 6/2007 | Wengrovitz et al. | 370/260 |
| 2007/0206759 A1 | 9/2007 | Boyanovsky | |
| 2007/0271090 A1* | 11/2007 | Barkley et al. | 704/200 |
| 2008/0065998 A1 | 3/2008 | Brown et al. | |

FOREIGN PATENT DOCUMENTS

| | | |
|---|---|---|
| JP | 3274603 A | 12/1991 |
| WO | 92/17021 A1 | 10/1992 |

OTHER PUBLICATIONS

Written Opinion of the International Searching Authority for PCT/EP2009/006399 dated Feb. 19, 2010 (Form PCT/ISA/237) (English Translation).

International Preliminary Report on Patentability for PCT/EP2009/006399 dated Mar. 8, 2011 (Forms PCT/ISA/237) (German Translation).

International Preliminary Report on Patentability for PCT/EP2009/006399 dated Mar. 8, 2011 (Forms PCT/IB/373 and PCT/ISA/237) (English Translation).

Database WPI Section PQ, Week 199803 Thomson Scientific, London, GB; Class P86, AN 1998-023725 XP002564898 "Voice summation system for e.g. video conference voting—has display unit which shows total amount of recognised voice data counted by operation unit" & JP 09 281991 A ((NIDE ) Nippon Denki Software KK) Oct. 31, 1997.

International Search Report for PCT/EP2009/006399 dated Feb. 19, 2010 (Form PCT/ISA/210) (German Translation).

International Search Report for PCT/EP2009/006399 dated Feb. 19, 2010 (Form PCT/ISA/210) (English Translation).

* cited by examiner

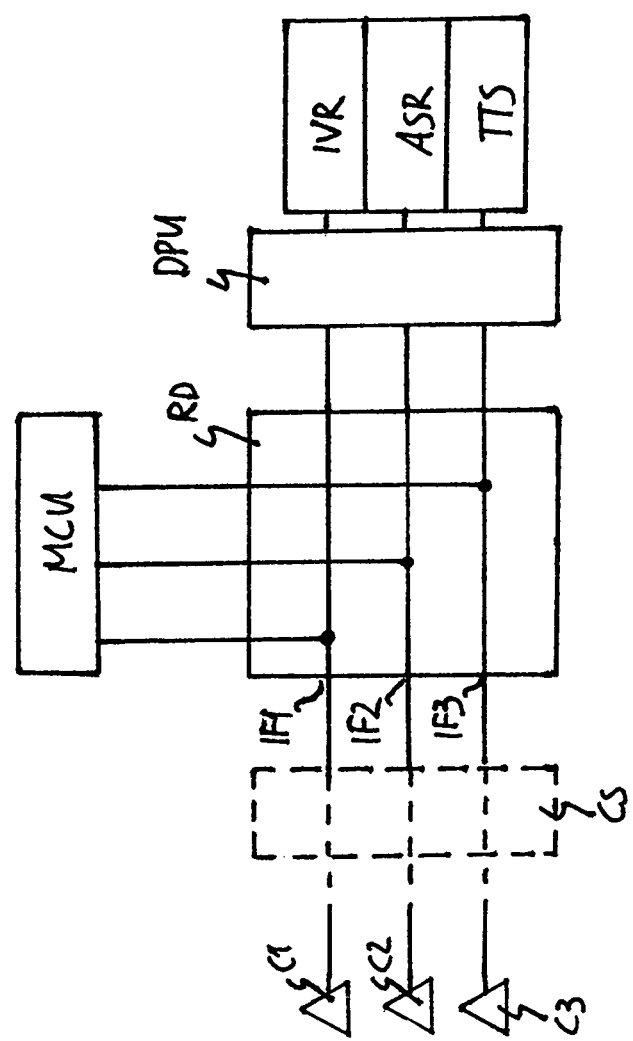

CONFERENCING UNIT AND METHOD FOR CARRYING OUT MULTI-POINT COMMUNICATION

CROSS-REFERENCE TO RELATED APPLICATIONS

This application is the United States national phase under 35 U.S.C. §371 of PCT International Patent Application No. PCT/EP2009/006399, filed on Sep. 3, 2009, and claiming priority to German Application No. 10 2008 045 929.1, filed on Sep. 4, 2008. Those applications are incorporated by reference herein.

BACKGROUND OF THE INVENTION

1. Field of the Invention

Embodiments of the invention relate to a conferencing unit for multi-point communication for carrying out voice-based telephone conferences. Preferred embodiments relate to a conferencing unit, in which the decisions discussed and made by conference participants are requested and stored. Embodiments also relate to a method for carrying out multi-point communication.

2. Background of the Related Art

Telephone conversations with at least three participants are known as teleconferences and are supported by known communication systems as a performance feature.

There are furthermore conference units and conference servers which are known to exceed the range of performance features offered by the aforementioned communication systems. Such conference servers offer, for example, independent dial-in and authentication of the conference participants, an audiovisual or multimedia exchange of user data between conference participants and much more. Modern conference servers follow in particular the general trend of using VoIP (Voice over Internet Protocol) technology for exchanging and compiling user data from individual conference participants.

Teleconferences are often conducted with the goal of reaching a decision. Depending on the organization, the participants should thereby arrive at a majority decision or a decision should be made by decision-makers in consultation with other conference participants.

The outcome of this decision is then customarily manually entered into minutes or in corresponding electronic documents. Aids for decision making and documentation have not been provided by the conferencing unit until now.

BRIEF SUMMARY OF THE INVENTION

A conferencing unit for multi-point communication between multiple conference participants comprises a multi-point control unit with multiple user data interfaces. Each user data interface is set up for a bidirectional user data exchange with a respective conference participant. User data or "payload" here is understood to be audio data, especially voice data, but also multimedia data like audiovisual data or also digital data exchanged between applications. The multi-point control unit is set up for compiling the user data in a conference, which for audio data typically occurs as a mixture of audio channels. With audiovisual data, compiling typically is a two-fold display of the individual conference location and the conference location connected by video conferencing, or it can be a single display of the connected conference location.

Means for rerouting the respective bidirectional user data exchange of at least one eligible conference participant to a decision-processing unit are assigned to user data interfaces. This means that the means for carrying out a voice-based interaction with the eligible conference participant—e.g., means also known in the industry as IVR (Interactive Voice Response)—and for recognizing decisions voiced by the eligible conference participant, are assigned to the decision processing unit. The decision processing unit provides a means for converting the spoken decisions into a machine-readable format—e.g., a means also known in the industry as TTS (Text To Speech)—as well as a means for conference participant-specific storage of the decision converted into machine-readable format.

A machine-readable format in this case is understood to be a format that can be processed through other applications or programs of any computer system, such as saving in a file or in a database, transmitting to another processing unit in the form of a variable or as a set flag, etc.

A particular advantage of the invention can be seen in the elimination of "media disruption" when documenting decisions. The invention facilitates joint data management of the decision-making points to be addressed as well as the decisions made by the individual respective conference participants with regard to the decision-making points.

Thus, manual entry of the decision outcomes in a decision log or in electronic documentation systems is advantageously unnecessary.

An example with additional advantages and embodiments of the invention is illustrated in greater detail in the following, based on the drawing.

BRIEF DESCRIPTION OF THE FIGURES

The single FIGURE shows a simplified diagram to explain the interaction of individual components according to an embodiment of the invention.

DETAILED DESCRIPTION OF THE INVENTION

Before a description based on the drawing, some explanations on the motivation for the invention follow.

The outcomes of teleconferences, especially the decisions reached during them, are currently recorded using logs that include the decision-making points as well as votes.

During the teleconference, each individual conference participant is asked to state his opinion or vote verbally. If individual participants wish to make a change during the course of the teleconference, they must interrupt its sequence and voice their request. The other conference participants must agree or disagree to this also. It customarily obligates the moderator of the teleconference to determine the vote of the conference.

Approaches that support decision making with computer-aided methods have so far had no effect on the sequence of a teleconference run by conventional means. Until now, computer-aided decision making has required running applications in parallel for documenting the outcomes of a conventionally run teleconference.

This is a disadvantage, not only in terms of the additional expenditure, but also due to a "media disruption" in documenting the decision, i.e., by consulting a documentation system in parallel with the predominantly verbal teleconference proceedings. Due to this media disruption, joint data management of the teleconference on the one hand as well as a separate documentation system on the other is not possible, or is possible only with great effort. This means that workflows resulting from the decision or vote during the teleconference cannot be automatically initiated.

Rather, using the present means, the subsequent workflows are manual, e.g., arranged by the moderator or person responsible, and involve corresponding entries made in documentation systems.

There are approaches known in which a conference for web-based collaboration (web conference) is provided in parallel to the voice-based teleconference. In some cases, participant voting is also supported in corresponding applications for web-based collaboration. However, a disadvantage of this approach is that the teleconference participants who do not have a computer available at the time of the teleconference or who have no access to a data network cannot participate in the web-based collaboration. Additionally, the aforementioned media disruption also exists with this approach.

An important reason why there has not yet been an approach offered in the industry that eliminates this media disruption is based on the fact that in conventional teleconference systems, all audio channels are customarily mixed into a common channel, and an uninterrupted interaction of individual conference participants in the form of voice commands that are transferred to a computer system is not possible.

The invention contributes to the present state of the art by introducing a novel concept, which provides, among other things, redirecting of a respective participant as well as a voice dialogue system for recording decisions of the individual participant.

An exemplary embodiment of the invention is explained in more detail based on the drawing.

The FIGURE shows a conferencing unit for multi-point communication between multiple conference participants C1, C2, C3. The conference participants C1, C2, C3 are represented in the drawing by symbolic telephone sets. This symbolic depiction obviously does not exclude the use of any computers, PCs, PDAs (Personal Digital Assistants), VoIP phones (Voice over Internet Protocol), etc., provided the aforementioned units allow conference participants C1, C2, C3 to exchange bidirectional user data which at least partially contains voice information.

To run the teleconference, user data are exchanged with a multi-point control unit MCU, which connects the conference participants C1, C2, C3. To do this, the multi-point control unit MCU assigns multiple user data interfaces IF1, IF2, IF3 that are arranged and combined in a rerouting device RD in the embodiment example shown, to connect the conference participants C1, C2, C3.

Alternatively, the user data interfaces IF1, IF2, IF3 are part of the multi-point control unit MCU, wherein rerouting as discussed in the following is executed directly by the multi-point control unit MCU in this alternative embodiment.

Between the conference participants C1, C2, C3 and the user data interfaces IF1, IF2, IF3, typically multiple communication means CS are arranged, symbolized by dashed lines in the drawing, which are not relevant to the depiction of the invented method. For example, this could be a communication system CS or switching unit for switching and controlling terminals C1, C2, C3 or, in the case of packet-oriented communication, multiple network node units such as routers, switches, etc. and/or servers.

Each user data interface IF1, IF2, IF3 is set up for a bidirectional exchange of user data with a respective conference participant C1, C2, C3. The user data in a conference are compiled in the multi-point control unit MCU, so, for example, respective bidirectional audio channels are mixed into a common channel.

A switchable decision processing unit DPU is connected with the user data interfaces IF1, IF2, IF3 via the rerouting device RD.

The decision processing unit DPU contains an interactive terminal IVR for carrying out a voice-based dialogue. This interactive terminal IVR contains a customary state-of-the-art means of recognition ASR for receiving voice-based decisions from eligible conference participants as well as a means of conversion TTS for synthesizing speech.

A conference participant's C1, C2, C3 user data channel to be redirected is linked with the decision processing unit DPU via rerouting. Alternatively, multiple reroutings can also be set up, though with the requirement that the user data channel of a first conference participant C1, which is set up for rerouting to the decision processing unit DPU, is not mixed with the user data channel of a second conference participant C2 for which a rerouting is also set up. In other words, on the side of the decision processing unit DPU, the first conference participant C1 and the second conference participant C2 are each presented with a respective independent voice dialogue.

The decision processing unit DPU of the teleconference unit or the teleconference server serves as an interactive terminal IVR (Interactive Voice Response) which, according to the current state of the art, presents a question and registers the spoken answer to it. For example, the conference participants C1, C2, C3 are presented with a decision-making point in the form of a question through the interactive terminal IVR in synthesized speech, whereby the interactive terminal optionally can also state possible decision or answer possibilities. The answer of the conference participant C1, C2, C3 is registered by the decision processing unit DPU and saved in a machine-readable form.

The synthesizing of voice-based recited decision-making points or other voice-based data of a conference participant C1, C2, C3 is performed using a means of conversion TTS for converting saved machine-readable data into a speech format. This means of conversion is also known in the industry as "TTS" (Text-To-Speech).

The analysis of the response or the voice-based commands of a conference participant C1, C2, C3 and its conversion into machine-readable commands is performed using the means of recognition ASR for conversion of speech commands into a machine-readable format. This means of recognition is also known in the industry as "ASR" (Automatic Speech Recognition).

Instead of controlling the interactive terminal IVR using voice-based commands, the decision processing unit DPU can be provided with an alternative or additional means—not shown—of selecting an option via the telephone keypad, which includes recognition of a DTMF (Dual Tone Multiple Frequency) signal or telephone signal based on a telephone key pressed.

The interactive terminal IVR or the decision processing unit incorporates the explained conversion method TTS for converting voice-based decisions into a machine-readable format as well as a means—not shown—for conference participant-specific storage of decisions converted into the machine-readable format.

The rerouting device RD offers the option to exempt an individual bidirectional user data exchange of an eligible conference participant C1, C2, C3 from being delivered to the multi-point control unit MCU and instead directing or "rerouting" the bidirectional user data exchange to a decision processing unit DPU. The restriction of an individual conference participant C1 is thereby of purely organizational nature, to be subject to the discretion of the deciding conference participant C1. In fact, multiple such reroutings is not prevented as long as for every individual rerouted conference participant, an individual dialogue system in the decision processing unit DPU is included in the sequence, or alternatively, multiple decision processing units DPU are available.

Rerouting is initiated through a voice-based password, for example, or through a reserved combination of several words during an established conference. Alternatively, rerouting can be initiated by any conference participant, preferably the moderator. Furthermore, initiation can be provided by web service. The bidirectional user data channel or audio channel of each individual participant C1, C2, C3 can consequently be masked from the mixed conference audio channel and assigned to a separate voice interface for decision processing by rerouting. This rerouting occurs bidirectionally as long as the channel leading to the participant—the conference participant's listening channel—as well as the channel coming from the participant—the conference participant's speaking channel—are rerouted.

According to an alternative embodiment of the invention, only the "decision-makers" are provided with the opportunity to vote, optionally with other participants hearing a "musical interlude," for example. Assignment of the roles of individual participants C1, C2, C3 occurs in the decision processing unit DPU, for example.

According to another alternative embodiment of the invention, each conference participant is identified by a personal PIN (Personal Identification Number). The personal PIN can be requested either during registration for the teleconference or with each participant response. The PIN can be sent to participants in advance via an encrypted email, recorded on an answering machine in advance or transmitted by SMS. Optionally, an individual PIN can be used with a restricted period of validity.

According to another alternative embodiment of the invention, the decision-making points can be programmed before and/or during the teleconference via voice control or web service.

In an alternative embodiment, the multi-point control unit MCU, which is designed as a teleconference server, includes interfaces—not shown—for connecting a web conference server (not shown). Besides that, this web conference server can be provided with a web service that allows the presented decision queries to also be answered by input into an electronic form, for example, an HTML page (Hypertext Markup Language).

According to a further alternative embodiment of the invention, a status for the decisions or decision-making points of the conference participants can be queried during the teleconference via a dialogue input procedure according to the decision processing unit of the invention or via a web service. This can optionally interactively control a parallel web-based conference application.

After concluding the teleconference or while the teleconference is still in progress, a web service interface—not shown—can automatically generate a log file or minutes of the decision points, the outcomes of voting and a detailed list of the participants involved.

After concluding the teleconference, workflows in additional applications—not shown—can be automatically initiated depending on the course of the decisions. Participant-related information can be transmitted to other applications—not shown—that execute workflows assigned individually to a conference participant. An example of such automated processing would be triggering an ordering process with the personal data from the teleconference.

According to the invention, documentation of the decision outcomes facilitates subsequent processes, which permits immediate initiation of workflows even during the teleconference. The initiation is "server-triggered" in the process, i.e., without requiring the intervention of a physical person.

The invention allows the use of authentication methods for individual assignment of decisions and thereby authentication in the decision processing. In connection with this, embodiments of the invention provide secure authentication through encrypted sending of personal PINs and identification of each individual participant by personal PINs during response input. Optionally, a connection with an authorization database—not shown—can be set up.

One embodiment of the invention provides control of the telephone conference process itself, that is, feedback on conference speed, situation description or discussion topic, carrying out continuous voting, or a change to the next agenda item. Corresponding run-time statistics can be made available to the moderator and/or the lecturer, for example.

The invention allows support of an interactive release of a purchase order or a request for sending an extended information packet during a teleconference, in which a product can be presented and explained, without interruption of the teleconference itself and includes an assurance of data integrity for prevention of errors as well as extending the opportunity to archive points discussed.

A decision by conference participants is not limited to a decision regarding approval of predefined agenda items or open questions. The decision processing unit offers the option to provide a so-called "self-management" functionality, in which one of the conference participants can call up (i.e., listen to) personal data assigned to him or can change those data by means of voice-based instruction. An example of a piece of personal data is an email address stored for a conference participant, through which he can obtain a summary of the decisions made during the teleconference, for example. Both the address itself and the subscription for the summary are stored as personal data in the process and can be changed by the conference participants during a teleconference. Another example of a piece of personal data is the IP (Internet Protocol) address under which the conference participant is registered on a parallel web conference.

The invention supports a change of computer workstation during a conference, assuming that a conference participant might have to change rooms during the conference. This conference participant can continue to participate in the teleconference continuously by mobile phone, regardless of his change of location. As soon as the conference participant has arrived at his new workstation, he enters this as the new IP address and is automatically activated again in the web conference taking place in parallel.

The invention claimed is:

1. A method of carrying out a conference comprising:
a plurality of conference participant devices each connecting to a respective one of a plurality of conference participant data interfaces of a multi-point control unit for a telephone conference, bidirectional exchanging of conference participant data that is at least partially comprised of voice data for the telephone conference being provided via the conference participant devices connecting to the conference participant data interfaces;
at least one decision processing unit connecting to the conference participant data interfaces of the multi-point control unit via at least one rerouting device such that conference participant data for each of the conference participant devices is rerouted to the at least one decision processing unit such that conference participant data from each of the conference participant devices is not mixed with other conference participant data from other conference participant devices when routed to the at least one decision processing unit;

the at least one decision processing unit carrying out a voice based dialogue with conference participants via the connection to the conference participant data interfaces that comprises:
(i) the at least one decision processing unit presenting the conference participants with at least one decision making point in a form of a question, and
(ii) each of the conference participant devices transmitting an answer to the question via conference participant data that is comprised of voice data that is transmitted to the at least one decision processing unit via the at least one rerouting device such that the answer from each conference participant device is not mixed with answers from other conference participant devices;

the at least one decision processing unit registering the answer received from each of the conference participant devices and saving that answer in a machine-readable form; and the at least one decision processing unit automatically generating a log file that identifies the question and the answer to the question received from each of the conference participant devices and identifies an outcome of voting and identifies how the conference participants voted.

2. The method of claim 1 wherein the multi-point control unit is a teleconference server and each of the conference participant devices is a computer, personal digital assistant, or telephone.

3. The method of claim 1 wherein each of the conference participant devices is connected to the respective one of the conference participant data interfaces via a communication system.

4. The method of claim 1 wherein the at least one decision processing unit has an interactive terminal for carrying out the dialogue.

5. The method of claim 1 wherein the dialogue further comprises:
each of the conference participant devices transmitting a password within the conference participant data transmitted to the at least one decision processing unit.

6. The method of claim 1 wherein the dialogue results in authorization to accept a release of a purchase order.

7. The method of claim 1 wherein the method further comprises:
one of the conference participant devices transmitting personal data assigned to a conference participant associated with that conference participant device to the at least one decision processing unit.

8. The method of claim 7 wherein the personal data is comprised of at least one of an email address and an address associated with a web conference.

9. A communication system comprising:
a plurality of conference participant devices;
at least one decision processing unit;
a multi-point control unit having a plurality of conference participant data interfaces; and
at least one rerouting device;
each of the conference participant devices being connectable to a respective one of the conference participant data interfaces of the multi-point control unit for a telephone conference, bidirectional exchanging of conference participant data that is at least partially comprised of voice data for the telephone conference being transmittable via the conference participant devices connecting to the conference participant data interfaces;

the at least one decision processing unit connectable to the conference participant data interfaces of the multi-point control unit via the at least one rerouting device such that conference participant data for each of the conference participant devices is rerouted to the at least one decision processing unit during the telephone conference such that conference participant data from each of the conference participant devices is not mixed with other conference participant data from other conference participant devices when routed to the at least one decision processing unit;

the at least one decision processing unit carrying out a voice based dialogue with conference participants associated with the conference participant devices via the connection to the conference participant data interfaces that comprises:
(i) the at least one decision processing unit presenting the conference participants with at least one decision making point in a form of a question, and
(ii) each of the conference participant devices transmitting an answer to the question via conference participant data that is comprised of voice data that is transmitted to the at least one decision processing unit via the at least one rerouting device such that the answer from each conference participant device is not mixed with answers from other conference participant devices;

the at least one decision processing unit registering the answer received from each of the conference participant devices and saving that answer in a machine-readable form; and the at least one decision processing unit automatically generating a log file that identifies the question and the answer to the question received from each of the conference participant devices and identifies an outcome of voting and identifies how the conference participants voted.

10. The system of claim 9 wherein the multi-point control unit is a teleconference server and each of the conference participant devices is a computer, personal digital assistant, or telephone.

11. The system of claim 9 wherein each of the conference participant devices is connected to the respective one of the conference participant data interfaces via a communication system.

12. The system of claim 9 wherein the at least one decision processing unit has an interactive terminal for carrying out the dialogue.

13. The system of claim 9 wherein the dialogue further comprises:
each of the conference participant devices transmitting a password within the conference participant data transmitted to the at least one decision processing unit.

14. The system of claim 9 wherein the dialogue results in authorization to accept a release of a purchase order.

* * * * *